Figure 1:
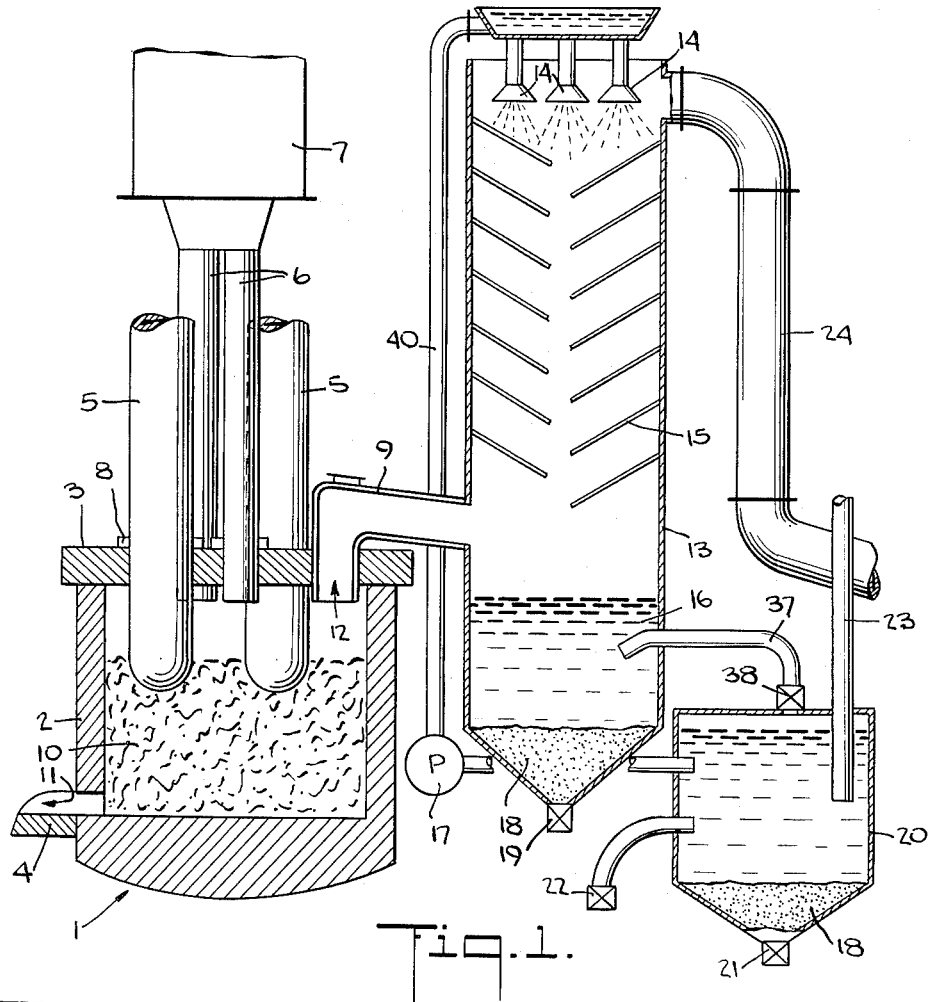

INVENTOR.
BY PAUL AUGUST FRANZ BAEUMERT

AGENT

Nov. 20, 1962  P. A. F. BAEUMERT  3,065,050
PROCESS OF PRODUCING FLUORINE COMPOUNDS FROM
FLUORINE-CONTAINING MINERALS AND THE LIKE
Filed June 10, 1958  2 Sheets-Sheet 2

INVENTOR.
PAUL AUGUST FRANZ BAEUMERT
BY Erich M. H. Radde
AGENT

United States Patent Office 3,065,050
Patented Nov. 20, 1962

3,065,050
PROCESS OF PRODUCING FLUORINE COMPOUNDS FROM FLUORINE-CONTAINING MINERALS AND THE LIKE
Paul August Franz Baeumert, Rheinstr. 412, Walsum, Lower Rhine, Germany
Filed June 10, 1958, Ser. No. 741,167
Claims priority, application Germany Aug. 23, 1957
5 Claims. (Cl. 23—88)

The present invention relates to the production of fluorine compounds and, more particularly, to a process of producing fluorine compounds from fluorine-containing materials and especially from minerals containing fluorine, such as, for instance, fluorite.

Heretofore fluorine compounds were obtained from fluorite by reacting such minerals with sulfuric acid. Thereby, hydrogen fluoride was obtained and the calcium content of said fluorite was converted into gypsum. This process, however, requires large amounts of sulfuric acid and, therefore, is not of optimum efficacy, especially in view of the fact that the valuable sulfuric acid is obtained in the form of gypsum which has almost no appreciable commercial utility. Another very grave disadvantage of this known process is to be seen in the fact that the fluorite, before the reaction with sulfuric acid, must be subjected to an extensive purification process because it is only very rarely available in the form of substantially 100% calcium fluoride. More particularly, care must be taken to remove as completely as possible siliceous impurities present in the fluorite before the reaction with sulfuric acid in order to obtain a substantially pure hydrofluoric acid or, respectively, aqueous solutions of such hydrofluoric acid.

The present invention has for its object to provide the art with a new, simple, and very effective process of producing fluorine and alkaline earth metal compounds from fluorite and other fluorine-containing minerals as starting materials whereby the use of sulfuric acid and, thus, operation with liquid reactants is avoided.

Other objects of the present invention and advantageous features thereof will become apparent as the description proceeds.

According to the present invention all the disadvantages of the known processes are avoided and a number of very remarkable advantages are achieved, especially the advantage that the entire fluorine content of the charged starting material is obtained in the form of volatile fluorine compounds, for instance, in the form of silicon tetrafluoride, which fluorine compounds are present in the gases discharged from the reaction furnace.

It is also known to use, as starting material, fluorite or the like fluorine-containing minerals, silica, and alumina, which are contained in said minerals and to melt such starting minerals in an electric furnace. However, when proceeding in this manner, the fluorine is present in the gases discharged from the furnace in the form of silicon fluorides and hydrofluoric acid. Thereby, it is left to chance in what proportions both compounds are present in said gases. Furthermore, this known process has the disadvantage that the resulting gases are not of uniform composition and that, therefore, they can be worked up with great difficulty only.

In principle, the process according to the present invention consists in melting fluorine-containing minerals with silica or a silica compound and/or with carbon-containing materials in an electric furnace in such a manner that the charged starting material contains an amount of chemically bound silicon and/or carbon that not only all the fluorine contained in the starting material and expelled when melting the mixture is chemically bound in the form of silicon tetrafluoride and/or in the form of an organic fluorine compound, for instance, of carbon tetrafluoride ($CF_4$) but also that the other components of the charged starting material yield an alkaline earth metal silicate melt and/or alkaline earth metal carbide which melts are preferably of high fluidity.

According to a preferred embodiment of the present invention a basic alkaline earth metal silicate melt is obtained thereby, wherein other substances than alkaline earth metal silicates may be present but wherein no or only insignificant amounts of substances should be present which might contaminate the silicon tetrafluoride or the organic fluorine compound when they leave the reaction furnace in the gaseous state. Especially alkali metal compounds should not be present in such an alkaline earth metal silicate melt.

The amount of silicon and/or of carbon and the amount of other components of the charged starting materials, such as flux additions, are adjusted in such a manner that the silicon content and/or the carbon content does not substantially exceed the amount required for forming the slag, silicon tetrafluoride and/or the volatile organic fluorine compounds.

The slag is withdrawn from the electric melting furnace in fluid form. The fluorine compound discharged in gaseous form from the reaction furnace, for instance, silicon tetrafluoride, which is obtained in anhydrous condition if the charged starting material is substantially anhydrous, is subsequently worked up to fluorine compounds, either directly by suitable reaction or by cleavage or, respectively, after cleavage of the silicon tetrafluoride to yield pure fluorine or, respectively, hydrogen fluoride.

According to another embodiment of the present invention there are added to the charge in addition to or, respectively, in place of the silica or silica compound, carbon-containing materials, for instance, coke, so that a mixture of fluorine-containing minerals, carbon-containing materials such as coke, and, if desired, silicon-containing materials are present in the electric furnace. The silica or silica compounds may either be present in the starting fluorine-containing minerals or they may separately be added thereto. Said mixture is then molten in the electric furnace.

Whether silicon-containing materials or carbon-containing materials or both are present in the molten mixture does not affect the principle of the present invention. In both cases the entire fluorine is obtained in gaseous form in the gases leaving the furnace. If the fluorine-containing minerals contain silica or silica compounds or if such silicon-containing materials are added, there are obtained not only volatile silicon fluoride compounds, such as silicon tetrafluoride, but, when carbonaceous materials are added, also organic fluorine compounds, such as carbon tetrafluoride. If the fluorine-containing starting material is free of silica or silica compounds and if no siliceous material is added to the reaction mixture, only volatile organic fluorine compounds are produced due to the presence of and by reaction with the carbon. The composition of the resulting carbon fluorides has not yet been determined with certainty. All these volatile silicon fluoride compounds and organic fluorine compounds leave the furnace together with the gases evolved in the course of the operation.

An essential advantage of the process according to the present invention is the possibility of using fluorine-containing minerals in their natural form as they are available to the art because their content of accompanying substances, for instance, of silica-containing impurities, is utilized or, respectively, is adjusted to the required amount by the addition of corresponding amounts of siliceous materials, should the silica content of the starting material be smaller than required for completely binding the fluorine as silicon tetrafluoride and for forming an alkaline earth metal silicate slag. If the amount of silica in this process is adjusted in such a manner that it permits the formation of a slag of rather high fluidity, for instance, of a basic alkaline earth metal silicate slag, no unnecessary ballast material is supplied to the electric furnace while a silicon tetrafluoride of a purity sufficient for further working up is obtained. On the other hand, a molten silicate slag which is substantially free of fluorine is obtained and can readily be discharged from the furnace.

The presence of aluminum silicates and other silicates or the like components in the slag does not disadvantageously affect the process if care is taken that no components which evaporate at the melting temperature are present in the furnace and that more in particular the presence of substantial amounts of alkali metal compounds is avoided since such alkali metal compounds volatilize and will cause contamination of the silicon tetrafluoride.

The essential feature of the present invention is, thus, to be seen in the fact that substantially the entire fluorine present in the starting material is obtained in the furnace in the form of volatile fluorine compounds, for instance, in the form of silicon tetrafluoride if no carbon-containing materials are added, or in the form of volatile silicon fluoride or carbon tetrafluoride or other organic fluorine compounds in addition to silicon tetrafluoride. Due to the fact that all the fluorine is obtained in the form of such volatile compounds leaving the furnace together with the gases, the advantage is achieved that commercial fluorine compounds can be produced from such volatile compounds by reactions known per se at low costs and with only a small expenditure in apparatus.

If fluorite is the starting material and if silica is added, the proportion of calcium, silica, and fluorine is preferably adjusted according to the following equation:

$$2CaF_2 + 2SiO_2 = SiF_4 + Ca_2SiO_4$$

Pure calcium fluoride melts at about 1403° C. while the melting point of a mixture of pseudo-wollastonite and tridymite melts at about 1436° C. Consequently, the fusion process can be carried out at comparatively low temperature whereby the highest temperatures have been determined as temperatures between about 1450° C. and 1600° C. Thereby, the fact is to be taken into consideration that meta-silicate starts to form at a temperature of about 1400° C. and that calcium orthosilicate starts to form at a temperature between about 1100° C. and about 1200° C.

The molten mixture contains preferably a small amount of coal used as igniting agent. The water content of the fused mixture should be rather low so that dry silicon tetrafluoride leaves the furnace.

When silica compounds as well as carbon are present in the molten mixture, there is formed, should the amount of carbon added be higher than that required for the formation of volatile fluorine compounds, not only the volatile fluorine compounds but also an alkaline earth metal slag containing carbide, for instance, a calcium carbide slag according to the following equation:

$$4CaF_2 + SiO_2 + 11C = 4CaC_2 + SiF_4 + 2CO + CF_4$$

If, for instance, the content of the molten mixture with respect to silica compounds is substantially zero, only the carbide is formed according to the following equation:

$$2CaF_2 + 5C = 2CaC_2 + CF_4$$

If the fluorine-containing starting material consists of very pure fluorite, for instance, of fluorite purified by flotation, very pure calcium carbide is obtained according to the last mentioned equation. Such a pure calcium carbide can readily be worked up to pure acetylene with a high yield.

This embodiment of the present invention, thus, permits to produce from a starting material mixture containing fluorite and carbon two valuable products in one operation. Said two products, i.e. the volatile fluorine compounds drawn off by suction from the furnace and the acetylene obtained from the calcium carbide can be worked up to synthetic plastic materials. Thereby, if desired, the polymerization products of acetylene may also be used.

The following preferred embodiments serve to illustrate the present invention without, however, limiting the same thereto. They serve to show the starting materials used, the mode and amount of charging such starting materials or of the components of the charge, the manner in which the charge is prepared for charging, the melting process and the like.

The starting material is charged in fine-grained form, in lumps, or in the form of briquettes. The charge should not contain any free water.

When proceeding according to the present invention, liberation of fluorine or, respectively, reaction of said fluorine, for instance, to form silicon tetrafluoride and its liberation is readily and completely effected whereby such liberation proceeds the more readily, the more fluid the slag is.

Reaction of the silicon compounds leaving the furnace, for instance, of silicon tetrafluoride either by splitting the same up to fluorine and by binding such fluorine, for instance, to form hydrogen fluoride, or by directly reacting said silicon tetrafluoride to commercially valuable, substantially pure fluorine compounds such as sodium fluoride and the like, represents a further object of the present invention.

It has been found that decomposition of the fluorine-containing starting material, for instance, of the fluorite in the electric furnace is favorably affected by the action of an electric arc. If melting in the electric furnace is caused by induction heating, driving off of the fluorine requires a longer period of time. Therefore, according to a preferred embodiment of the present invention, the voltage is chosen in such a manner that action of the electric arc is favored over that of induction. It is of advantage first to favor induction heating to cause melting and then to regulate the voltage in such a manner that the electric arc effect dominates.

The atmosphere in the furnace is preferably adjusted so that a slight reducing effect is achieved. Such a slightly reducing atmosphere of sufficient reducing power is maintained in the furnace by the combustion of the electrode carbon and of the added carbon used as igniting agent as well as by the cleavage of the carbonates present in the fluorite. Such a reducing atmosphere is maintained even if air enters the furnace through the electrode passages in the furnace cover and through the charging openings, when subjecting the furnace to subatmospheric pressure.

The furnace lining of the electro-furnace preferably consists of carbon.

On melting the starting material according to the present invention, cleavage of the fluorine-containing mineral, for instance, of fluorite, on the one hand, into fluorine which combines with silicon, for instance, to form silicon tetrafluoride, or with carbon, for instance, to form carbon tetrafluoride and other organic fluoride, and, on the other hand, into calcium which, due to its low melting point of about 700° C., favorably effects the process and which reacts with silica to form calcium silicate. The fluorides with silicon and/or carbon are withdrawn from the furnace by suction in the form of a hot gas stream.

According to a preferred embodiment of the present invention the temperature of the fusion process is kept so low that a small percentage of fluorine, for instance, 2% thereof, remains in the slag. Although, of course, in this case the yield of fluorine recovered as silicon tetrafluoride is not 100%, the energy requirements of the process are reduced to a very considerable extent. Thus, it is often advisable to leave a few percent of fluorine in the slag to be kept in fluid form. In many cases the fluorine content of the slag does not cause any trouble, especially if such slag is used for producing cement.

The generated gas is continuously removed by suction from the furnace, preferably by means of a fan provided at the end of the apparatus. Said fan is equipped with a variable speed transmission controlled by the regulating resistance for the electrodes in order to regulate the suction capacity of the fan and, thereby, to avoid aspiration of too large an amount of oxygen. The gas current contains not only the volatile fluorine compounds but also carbon dioxide. However, it is free of water since the charge is used in the dry state.

The resulting volatile fluorine compounds, for instance, gaseous silicon tetrafluoride may be worked up in different ways.

According to a preferred embodiment of the present invention, two absorption towers are arranged in series behind the gas outlet of the electric furnace. For instance, an aqueous suspension of clay is circulated in the first tower. The aluminum oxide content of the suspended clay reacts with silicon tetrafluoride and is dissolved to form aluminum fluoride. From time to time, the aqueous solution is withdrawn and corresponding amounts of aqueous clay suspension are added. The aluminum fluoride solution is filtered while hot and is either concentrated by evaporation or aluminum fluoride is precipitated, for instance, by the addition of aluminum oxide.

The moist residual gas is pumped into the second tower wherein, for instance, a solution of sodium carbonate is circulated. In contrast to the first tower, the reaction product is not dissolved but is precipitated, for instance, in the form of sodium silicon fluoride or of sodium fluoride. The precipitated compound is withdrawn at the bottom of the reaction tower and the sodium carbonate solution is continuously replaced.

The residual gas leaving the second tower does not contain any harmful components and, therefore, may be discharged into the open air.

If hydrogen fluoride is to be produced, silicon tetrafluoride present in the hot gas current leaving the reaction oven can be decomposed by the action of dry steam, for instance, of steam having a low density at 100° C., such as a density of 0.59 kg./cu. m. at atmospheric pressure. Thereby, activated precipitated silicic acid is obtained in addition to hydrogen fluoride.

When reacting silicon tetrafluoride with hydrogen, the reaction proceeds with better results because no water or only a small amount of water is formed.

In both cases, silicon dioxide carried along by the gas stream must be separated subsequently.

It is of particular advantage to decompose the silicon tetrafluoride by the action of a gas which does not cause precipitation of silicic acid so that no oxidation of silicon liberated during cleavage is required. Preferred gases of this type are hydrocarbons, for instance, methane.

When reacting silicon tetrafluoride with methane the following reaction takes place:

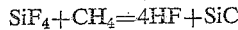

$$SiF_4 + CH_4 = 4HF + SiC$$

When passing a mixture of silicon tetrafluoride and methane in a proportion according to the above given equation through retorts heated to red heat, for instance, through graphite retorts at reduced pressure, crystals of silicon carbide formed according to the above given equation are deposited on the walls of the retort, particularly if said walls are line with silicon carbide. Preferably, retorts or batch stills of a length of 900 mm. and an inner width of 150 mm. are used and usually three of such retorts are arranged in series. Hydrogen fluoride may be recovered and measured by absorption in alkaline solution. In addition to the silicon carbide crystallizing on the lining of the retort walls, amorphous silicon carbide is deposited when working under the conditions described above. When using methane in excess, formation of graphite is also observed.

The resulting hydrogen fluoride is substantially free of silicon.

According to said preferred embodiment of the present invention, the gas containing silicon tetrafluoride is mixed with methane and the mixture is passed through graphite retorts or retorts lined with silicon carbide whereby, on the one hand, silicon carbide and, on the other hand, hydrogen fluoride is obtained.

The volatile organic fluorine compounds, for instance, carbon tetrafluoride and the like, which are formed when the molten reaction mixture is completely free of silica, can also readily be decomposed to or converted into the desired valuable fluorine compounds.

When carbon is added to the reaction mixture, the carbon is preferably admixed in the form of coke, for instance, petroleum coke, or in another form, such as carbon black or graphite.

The attached drawings show a preferred apparatus used in the preparation of fluorine compounds according to the present invention from silicon-containing starting materials.

Figure 2:
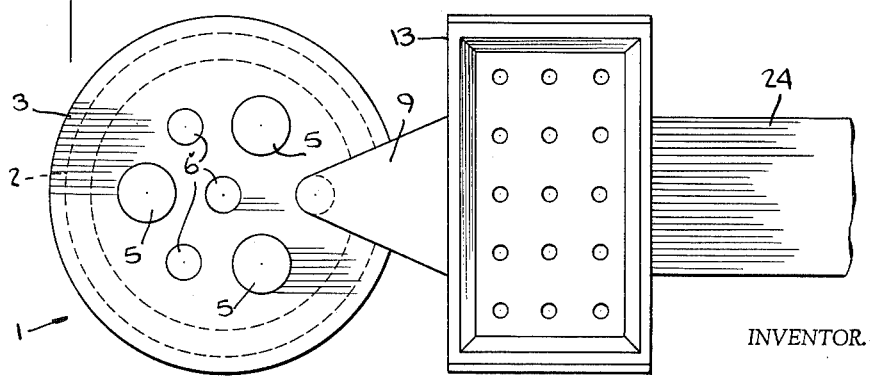
Figure 3:
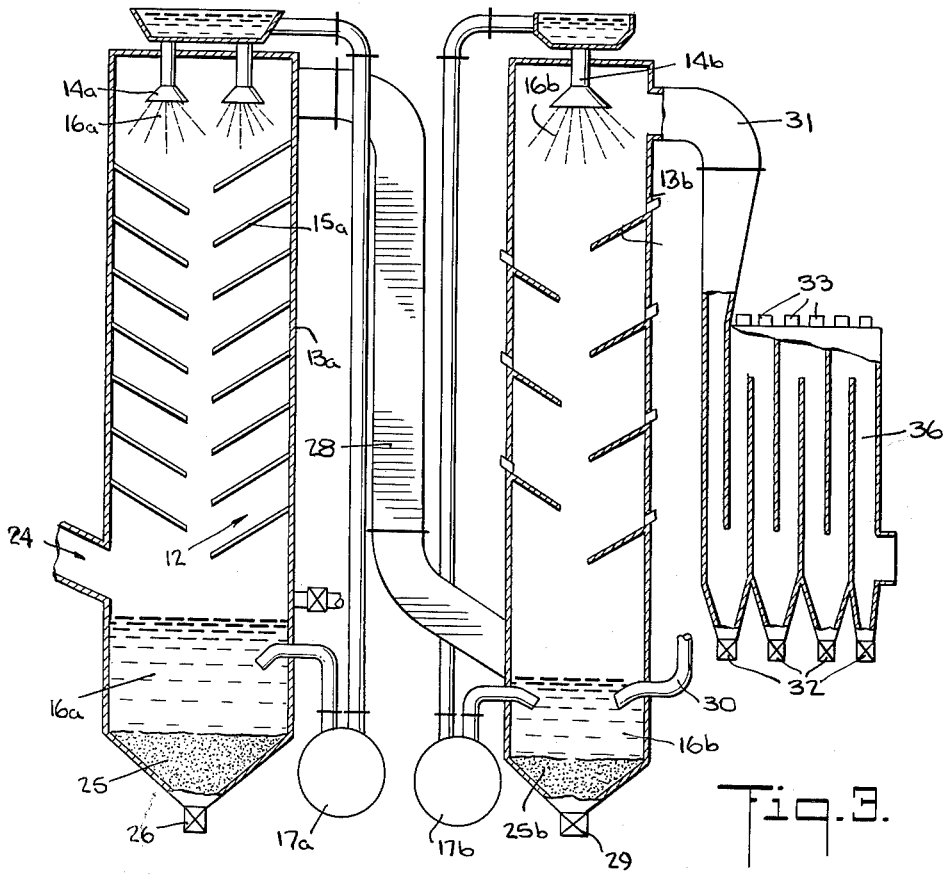
Figure 4:
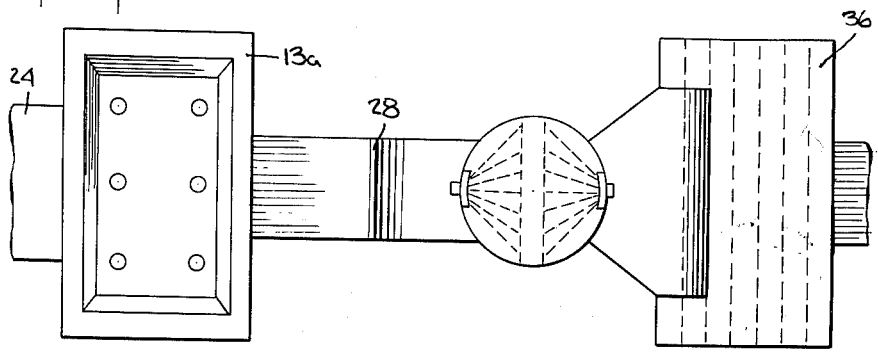

FIGURES 1 and 3 of said drawings show a vertical cross-sectional view through a three-phase electro-furnace and three absorption towers arranged in series and FIGURES 2 and 4 show a top view of the same apparatus.

The three-phase electro-furnace consists of furnace chamber 1 provided with lining 2, furnace cover 3, slag tap hole and spout 4, three carbon electrodes 5, three charging tubes 6 through which the starting material is passed from hopper 7 into furnace chamber 1, and water-cooled gas outlet tube 9. Furnace cover 3 is provided with cooled sealing rings 8 of bronze around electrodes 5, charging tubes 6, and outlet tube 9.

The furnace contains the molten mixture 10 of calcium fluoride and silica which yields slag 11. The gaseous reaction products 12 generated by the reaction are drawn off by suction by means of a fan which is arranged at the end of the apparatus and which is not shown in the drawings. The draft is regulated so as to avoid the formation of a vacuum in the furnace. If formation of a vacuum cannot be avoided, a current of carbon monoxide is conducted around sealing rings 8 so as to prevent air from entering the furnace.

The reaction gases enter the first absorption tower 13 which is, for instance, of rectangular shape, as shown in the attached drawings. Tower 13 is lined with a neutral lining material and is equipped with sprinkler 14 and with baffle plates 15 which may be sprinkled or sprayed by separate sprinklers. An aqueous suspension of calcined clay 16 is circulated in tower 13 by means of pump 17. In the lower parts of the tower, sludge 18 settles. Said sludge 18 consists substantially of silica formed in the course of the enrichment of the solution with aluminum fluoride. When required, said sludge 18 is removed from tower 13 by means of slide valve 19.

The supernatant aqueous solution 16 is conducted into container 20 through overflow pipe 37 provided with valve 38. Any solid matter which is carried along from tower 13 into container 20 settles in said container 20 as sludge 18. Supernatant liquid 16 is mixed, if required, with freshly prepared aqueous clay suspension supplied through supply pipe 23. It is pumped and conducted to sprinkler 14 by means of pipe 39, pump 17 and pipe 40. Solution 16 enriched with aluminum fluoride is removed from time to time from container 20 through valve 22. The settled sludge 18 is removed by slide valve 21.

The residual gases pass through tube 24 from the top of the first absorption tower 13 to the bottom of the second absorption tower 13a, also of rectangular shape. The second tower 13a is also equipped with sprinkling system 14a and baffle plates 15a which may also be provided with separate sprinklers.

The gases are washed in said tower 13a with an aqueous sodium carbonate solution 16a which is circulated through said tower 13a by means of pump 17a. Thereby, any hydrogen fluoride which is still present in the reaction gases, is absorbed and precipitated as sodium fluoride or sodium silico fluoride ($Na_2SiF_6$) or as a mixture of both compounds. The precipitate settles in the lower part 25 of tower 13a and is discharged, when required, through valve 26. The sodium carbonate solution 16a is replenished with fresh sodium carbonate solution through supply pipe 27.

The treated gases are conducted through tube 28 into the third absorption tower 13b of cylindrical shape where they are washed with a suspension of calcium oxide 16b (slaked lime suspension) in order to remove the last traces of hydrogen fluoride therefrom. Finely divided fluorite precipitates which settles from the lime suspension 16b in the form of sludge 25 and is removed, when required, through slide valve 29. Fresh slaked lime suspension is added through supply pipe 30. The slaked lime suspension 16b is sprinkled into absorption tower 13b through sprinkler 14b. Tower 13b is also provided with baffle plates 15b which may also be sprinkled separately with the slaked lime suspension 16b. Pump 17b permits circulation of said suspension 16b through tower 13b.

The thus treated gases are passed through tube 31 into baffle plate separator 36 wherein moisture and finely divided solid particles are separated and deposited. The liquid settled in the lower part of said separator 36 is removed through valves 32. Solid particles are removed from the walls of said separator 36 by means of sprinkler devices 33. The thus purified gases are withdrawn by suction by means of a fan which is provided at the outlet of separator 36. The gases are then forced, for instance, into a waste gas flue.

The hereinabove described apparatus for the production of fluorine compounds from silicon-containing starting materials may also be used for the other embodiment of the present invention wherein starting materials are used which contain carbon compounds in place of silica or silcia compounds as admixtures and wherein the fluorine-containing materials do not contain silica or silica compounds or contain such compounds only in a small amount.

In this case, the charge consists of fluorite and carbon, for instance, in the form of petroleum coke or an anthrazite material which, when burned, gives only a small amount of ashes. The carbon is admixed to the fluorite in an amount sufficient for the formation of a carbide slag and for the conversion of the fluorine into volatile carbon fluorides, such as carbon tetrafluoride $CF_4$. Small amounts of silicic acid present in the reaction mixture are thereby converted into silicon tetrafluoride. The total amount of volatile carbon fluoride compounds are finally obtained as a solid (precipitated) product. The molten mixture in the electric furnace consists of fluorite $CaF_2$, reactive carbon and, if the fluorite contains silicic acid derivatives, reductive carbon, and the carbide slag.

The absorption towers 13, 13a, and 13b are preferably lined with carbon or graphite. In both towers 13 and 13a, the absorption medium 16 and 16a, which reacts with the gases 12 from the electric furnace, consists, for instance, of an aqueous suspension of graphite and charcoal dust. Sludges 18 and 25 settle from the absorption medium. Said sludges contain precipitated carbon fluoride compounds up to carbon monofluoride CF consisting of 61.3% F and 38.7% C.

If necessary, the residual gases may be washed in the third tower 13b with an aqueous suspension of calcium oxide CaO as described hereinabove in order to convert any residual hydrogen fluoride into calcium fluoride and to obtain fluorine-free waste gases.

The following examples serve to illustrate the present invention without, however, limiting the same thereto.

*Example 1*

A three current phase electric furnace 1 is used the lining 2 of which consists of burnt carbon. Prefabricated carbon bricks may also be used. The furnace cover 3 consisting of magnesia bricks in an iron fitting contains three holes for the electrodes 5 and three holes for the charging tubes 6. The electrodes 5 and the charging tubes 6 are cooled by cooling rings 8 of bronze through which water flows as cooling medium. The furnace is grounded.

The absorption towers 13 and 13a are lined with glazed hard-burned bricks. The connecting tube 9 between the furnace 1 and the first tower 13 and the lower part of said tower are lined with Carborundum bricks. The connecting tube 9 is equipped with a jacket cooled with water.

Pumps 17 and 17a used for the circulation of the solutions or liquids in the towers are cast-iron pumps without stuffing boxes.

The electrode potential is 75 volts. The expenditure of energy of a furnace unit operating with 750 kilovolt-amperes and arranged for continuous operation is as follows:

For 1300 kg. of the starting charge__ 970 kw.-h.
or, respectively,
For 1000 kg. of the starting charge__ 750 kw.-h.
and calculated for
1000 kg. of $SiF_4$------------------ About 1950 kw.-h.
100 kg. of F----------------------- About 2680 kw.-h.

The electrode loss amounts to 10 kg./long ton of charge and, when using graphite electrodes of corresponding dimensions to about 8 kg./long ton.

The highest temperature of the slag at the slag hole, determined pyrometrically, is 1530° C. The temperature of the gases leaving the oven and measured 3 m. behind water-cooled gas outlet 9 is 710° C.

The following amounts of gaseous products are produced:
500 kg. of silicon tetrafluoride,
117 kg. of carbon dioxide produced from 12 kg. of carbon electrode material and from the added ignition carbon,
770 kg. of a slag of the following composition:
  68.55% CaO;
  0.52% MgO;
  0.93% BaO;
  25.48% $SiO_2$;
  1.16% $Al_2O_3$;
  2.10% F.

The hot reaction gases are passed through the hot absorption towers 13 and 13a. In the first tower 13 a suspension of 600 kg. of clay in 7 cu. m. of water is circulated. The calcined clay has the following composition:

43.0% $Al_2O_3$
0.53% $Fe_2O_3$
1.20% alkali metal oxides
0.37% $TiO_2$
0.24% CaO
0.11% HgO
0.00% $P_2O_5$
54.20% $SiO_2$.

5,000 liters of solution containing 54 g. of fluorine per liter and 40 g. of aluminum oxide per liter are obtained.

Said solution is neutralized by the addition of hydrated aluminum oxide whereby a compound containing fluorine and aluminum is precipitated in the form of a gel.

In the second absorption tower 13a, a solution of 850 kg. of sodium carbonate $Na_2CO_3.10H_2O$ in 8 cu. m. of water is circulated. After filtration and washing the precipitated product, 182 kg. of sodium fluoride NaF containing 2.84% silica $SiO_2$ are obtained.

The residual solutions and mother liquors may again be used in the absorption towers and need not be worked up separately.

The following charge is used as a starting material:

Kg.
(a) Small grained fluorite containing 80% of $CaF_2$, the remaining 20% substantially being composed of $SiO_2$ _____ 1000
(b) Small grained pure quartzite, composed to 99% of $SiO_2$ _____ 300
                1300

20 kg. of ignition carbon are added to the dry mixed charge and the mixture is charged to furnace 1 by charging device 7.

The slag discharged from the electric furnace 1 is preferably quenched, for instance, by running it into water. Thereby, highly reactive glass-like products are obtained.

*Example 2*

The hot gases from the electric furnace 1 are mixed with methane and are conducted through retorts lined with silicon carbide and heated to red heat by electrical resistance heating.

The following products are obtained thereby:

290 g. of graphite-like pure carbon,
1220 g. of fully developed crystals of silicon carbide, and
2560 g. of settled fine crystals of silicon-carbide.

Furthermore, conversion of the hydrogen fluoride derived from the decomposition of silicon tetrafluoride in the hot silicon carbide retort yields 17,480 g. of dry sodium fluoride containing about 1.23% silica.

*Example 3*

This example illustrates the process according to the present invention with respect to the production of a carbide slag and of carbon fluorides and metal fluorides. The electric furnace 1 is charged with the following materials:

Kg.
(a) Pea-sized granular calcined crude fluorite ____ 1,000
  Analysis:
    Calcium fluorite (83% $CaF_2$), 830 kg.
    Calcite (1% $CaCO_3$), 10 kg.
    Quartz (16% $SiO_2$), 160 kg.
(b) Pea-sized calcined coal for reduction and reaction consisting to 50% of petroleum coke and to 50% of charcoal _____ 390
  Average analysis:
    95% C=370.5 kg.
    Ash; 5%=19.5 kg.
    The total charge amounts to _____ 1,390

The charge is introduced into a furnace 1 through hopper 7 and charging tubes 6 and is molten therein. The electrode potential of the furnace is between 90–110 volts. The electrode loss amounts to 12 kg./long ton of charge. The expenditure of energy for the above mentioned charge is 1,580 kw.-h.

690 kg. of a carbide slag are obtained thereby. Said slag has a composition of 655 kg. of calcium carbide and 35 kg. of calcium oxide. Substantially no silicon, silica, and/or fluorine are present in said slag. This shows that all the silica present in the starting fluorite is converted to silicon tetrafluoride.

The following amounts of gaseous products are produced:

280 kg. of silicon tetrafluoride,
220 kg. of carbon tetrafluoride, and about
160 kg. of carbon monoxide.

The reaction gases formed during fusion are conducted, by suction, into the absorption towers 13 and 13a described in Example 1. When proceeding in this manner it is not necessary to line the absorption towers with carbon or graphite.

In the first reaction tower 13 a suspension of 160 kg. of charcoal dust and 80 kg. of electro-graphite dust in 7000 l. of water are circulated while in the second reaction tower 13a an aqueous suspension of 100 kg. of charcoal dust and 20 kg. of electro-graphite dust in 7000 l. of water are used. In washing tower 13b, the waste gases are finally treated with about 5,000 l. of a circulating 5% sodium carbonate solution.

The sludges which settle in absorption tower 13 and absorption tower 13a are combined and washed. Thereby, there are obtained Carbon fluoride (type CF) in the form of a gritty, coarse-powdered, black to silver-grey material having a fluoride content of 67.68% and a carbon content of 32.32% _____kg__ 645

This indicates that the carbon fluoride obtained in the form of such a sludge consists not only of a fluoride of the formula CF but also of other fluorides, for instance, of fluorides of the formula $C_4F_8$, $C_5F_{10}$, $C_6F_{12}$, or $C_7F_{14}$ and the like. It is, of course, necessary that an excess of carbon is always present in the reaction furnace.

Thus, said above given charge of 1,390 kg. yields the following products:

690 kg. of carbide slag,
645 kg. of carbon fluoride/fluorides of the formula $C_xF_y$,
24 kg. of a metallic material consisting of 48% Si, 9% Al, 26% Si, and 17% Ca, which is obtained from the iron cover of the carbon electrodes, from the silicates of the ash, and from decomposed fluorite, and
160 kg. of finely dispersed highly active silica obtained as residue from the wash waters used in washing the carbon fluoride sludge.

1,519 kg.

In calculating the total amount of reaction products, the carbon monoxide produced during the reaction is not taken into consideration.

Kw.-h.
The energy consumption is _____ 1,580
i.e.
For 1000 kg. of reaction products _____ 1,040
And for 1000 kg. of carbide slag without taking into consideration the gaseous reaction products _____ 2,300

40 kg. of a precipitate consisting of 60.5% F, 24.4% Na and 15.1% Si are obtained in washing tower 13b from the circulated sodium carbonate solution.

The 160 kg. of finely dispersed highly active silica mentioned in the above given list of reaction products are obtained from the wash waters resulting from washing the carbon fluorides by filtering, drying, and calcining the wash water. The finely pulverized white material contains 99.9% of silica.

The fluorine recovery is higher than 98% as follows from the hereinafter given calculation:

Kg. of fluorine
In 830 kg. of fluorite with 48.5% F of the charge there are contained _____ 402.55
The carbon fluoride/fluorides contain _____ 372.00
The sodium silicon fluoride ($Na_2SiF_6$) contains __ 24.00
  Total amount _____ 396.00 corresponding to 92.10% of fluorine recovered in the form of carbon fluorides and 5.95% of fluorine recovered in the form of sodium silicon fluoride ($Na_2SiF_6$). The loss is about 6.55 kg. corresponding to 1.95%.

If the electric furnace is charged with fluorite which is practically free of silica, the amount of carbide slag is increased, and the amount of carbon suspended in water in absorption towers 13 and 13a can be decreased while the yield of carbon tetrafluoride or carbon fluorides of the formula $C_xF_y$ increases in accordance with the increased amount of fluorine in the charge.

The gaseous reaction products can, of course, be worked up in an entirely different manner than described hereinabove. It is not necessary to pass them through the absorption towers 13 and 13a and the washing tower 13b. Any other processes of working up fluorine-containing gases as they are known to the art may also be employed likewise.

In the foregoing specification and in the claims annexed thereto the term silicon compounds comprises silica as well as silicates i.e. clay.

I claim:

1. In a process of producing an alkaline earth metal carbide and volatile fluorine compounds, the steps which consist in electrically melting a dry, substantially alkali metal compounds-free alkaline earth metal fluoride with carbon and silica, the amount of said silica being insufficient to react and combine with all the fluorine present in said fluoride, the amount of said carbon being sufficient to react and combine with the remainder of the fluorine in said fluoride and with substantially all the alkaine earth metal present in said fluoride and withdrawing the resulting gaseous silicon tetrafluoride and carbon tetrafluoride and the alkaline earth metal carbide slag formed in such melting from the melting chamber.

2. In a process of producing fluoride compounds and an alkaline earth metal carbide, the steps which consist in electrically melting a dry, substantially alkali metal compounds-free alkaline earth metal fluoride with carbon and silica, the amount of said silica being insufficient to react and combine with all the fluorine present in said fluoride, the amount of said carbon being sufficient to react and combine with the remainder of the fluorine in said fluoride and with substantially all the alkaline earth metal present in said fluoride, withdrawing the resulting gaseous silicon tetrafluoride and carbon tetrafluoride and the alkaline earth metal carbide slag formed on such melting from the melting chamber, successively passing the gaseous fluoride compound through an aqueous suspension of clay to yield aluminum fluoride, through an aqueous solution of sodium carbonate to yield a sodium fluoride, and through an aqueous suspension of calcium oxide to completely free the waste gases of fluorine.

3. In a process of producing fluoride compounds and an alkaline earth metal carbide, the steps which consist in electrically melting a dry, substantially alkali metal compounds-free alkaline earth metal fluoride with carbon and silica, the amount of said silica being insufficient to react and combine with all the fluorine present in said fluoride, the amount of said carbon being sufficient to react and combine with the remainder of the fluorine in said fluoride and with substantially all the alkaline earth metal present in said fluoride, admixing to the gaseous fluorides methane in the proportion of one part of methane to one part of silicon tetrafluoride, and heating the mixture to red heat to yield hydrogen fluoride and silicon carbide.

4. In a process of producing fluoride compounds and an alkaline earth metal carbide, the steps which consist in electrically melting a dry, substantially alkali metal compounds-free alkaline earth metal fluoride with carbon and silica, the amount of said silica being insufficient to react and combine with all the fluorine present in said fluoride, the amount of said carbon being sufficient to react and combine with the remainder of the fluorine in said fluoride and with substantially all of the alkaline earth metal present in said fluoride, and admixing hydrogen to the gaseous fluorides while still hot to form hydrogen fluoride.

5. In a process of producing fluoride compounds and an alkaline earth metal carbide, the steps which consist in electrically melting a dry, substantially alkali metal compounds-free alkaline earth metal fluoride with carbon and silica, the amount of said silica being insufficient to react and combine with all the fluorine present in said fluoride, the amount of said carbon being sufficient to react and combine with the remainder of the fluorine in said fluoride and with substantially all of the alkaline earth metal present in said fluoride, and passing the gaseous fluoride compounds containing carbon tetrafluoride through an aqueous suspension of finely divided carbon to precipitate therefrom insoluble carbon fluoride compounds.

References Cited in the file of this patent

UNITED STATES PATENTS

| | | |
|---|---|---|
| 1,634,122 | Stevenson | June 28, 1927 |
| 1,869,019 | McIntyre | July 26, 1932 |
| 2,026,519 | Curtis | Jan. 7, 1936 |
| 2,031,554 | Torchet | Feb. 18, 1936 |
| 2,238,516 | Chatterton | Apr. 15, 1941 |
| 2,631,083 | Engelson et al. | Mar. 10, 1953 |
| 2,737,442 | Cunningham et al. | Mar. 6, 1956 |
| 2,800,389 | Mockrin | July 23, 1957 |
| 2,819,151 | Flemmert | Jan. 7, 1958 |
| 2,835,711 | Wolfe et al. | May 20, 1958 |
| 2,886,414 | Secord | May 12, 1959 |

FOREIGN PATENTS

| | | |
|---|---|---|
| 396,703 | France | Feb. 2, 1909 |
| 71,065 | Norway | Oct. 7, 1946 |
| 621,569 | Great Britain | Apr. 12, 1949 |

OTHER REFERENCES

Russ: "The Chemistry of Fluorine and Its Inorganic Compounds," AEC–tr–3927 (part I), pages 340, 364 (1956).

Mellor: "Comprehensive Treatise on Inorganic and Theoretical Chemistry," vol. 6, pages 935 and 937 (1925). Vol. 5, page 301 (1924), Longmans, Green & Co., N.Y., and vol. 6, page 947.

Jacobson: "Encyclopedia of Chemical Reactions," vol. 6, page 103, Reinhold Publ. Corp., New York (1956), vol. 3, page 476 (1949).